Dec. 22, 1970    Z. DE GALOCSY ET AL    3,549,295
MEANS FOR EXCHANGING HEAT BETWEEN GASEOUS AND/OR VAPOROUS
AND/OR LIQUID AND/OR SOLID MEDIA AND SMALL HEAT-CARRIER
PARTICLES AND THEIR APPLICATIONS FOR CARRYING OUT
PHYSICO-CHEMICAL PROCESSES
Filed July 7, 1966    11 Sheets-Sheet 7
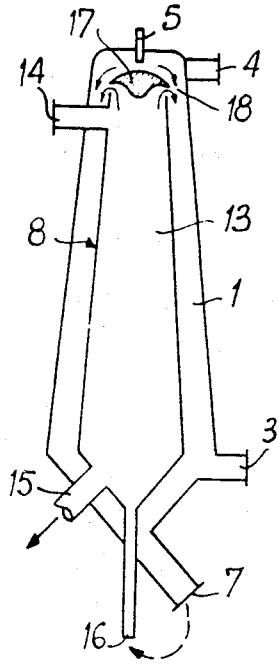
Fig.15
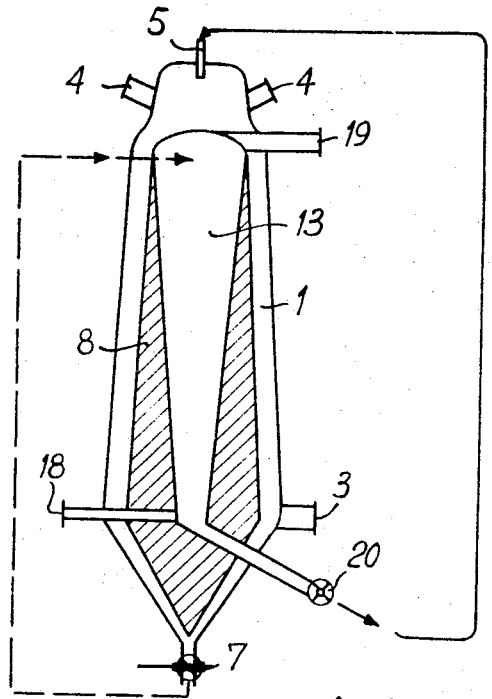
Fig.16
Fig.17
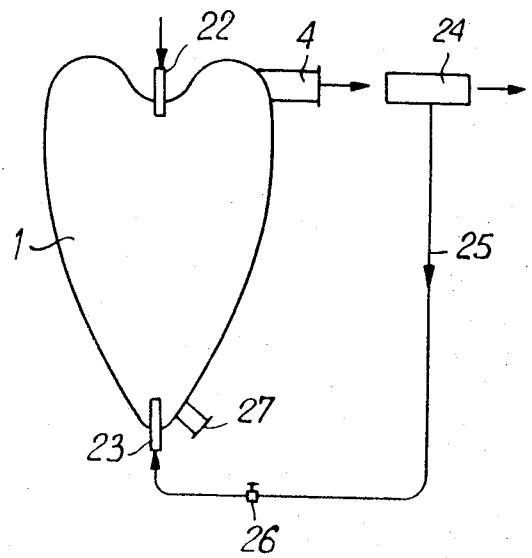

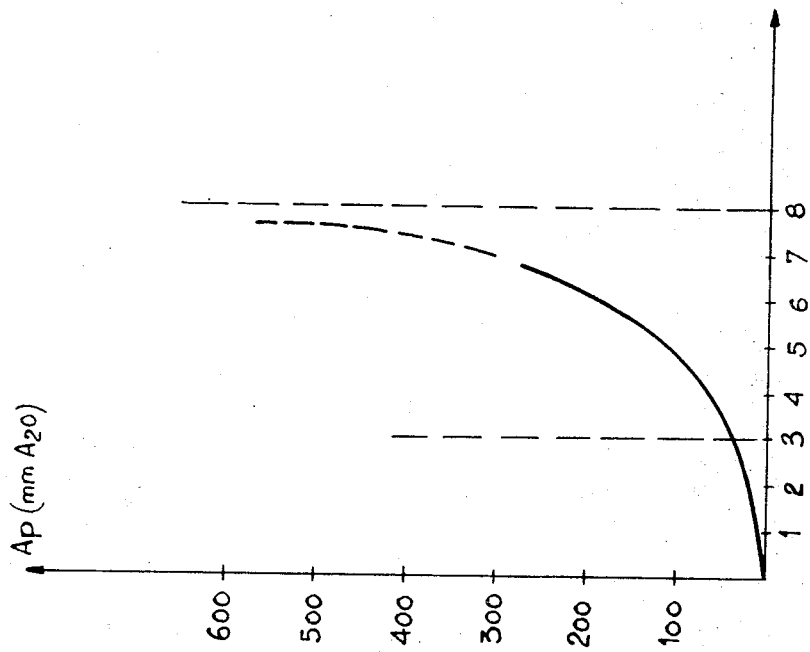
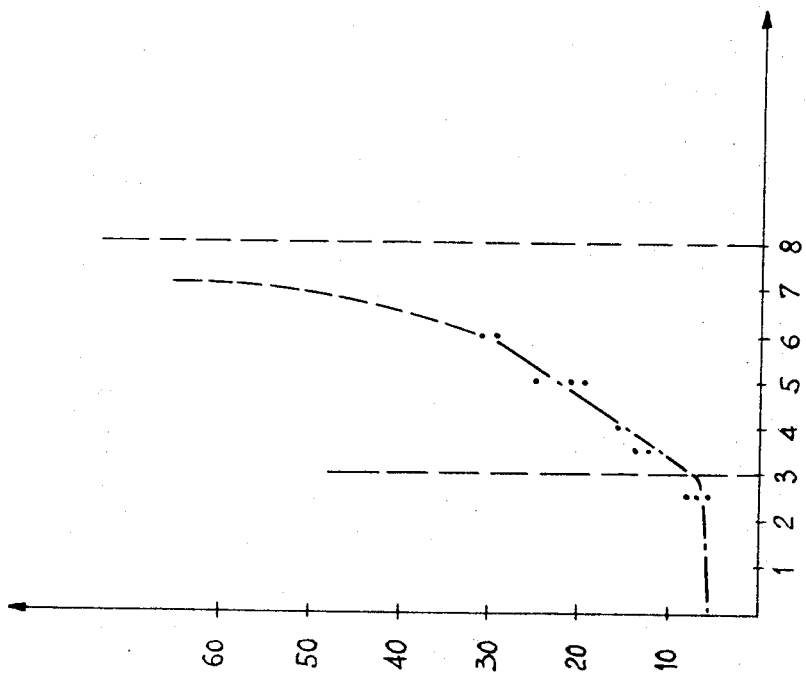

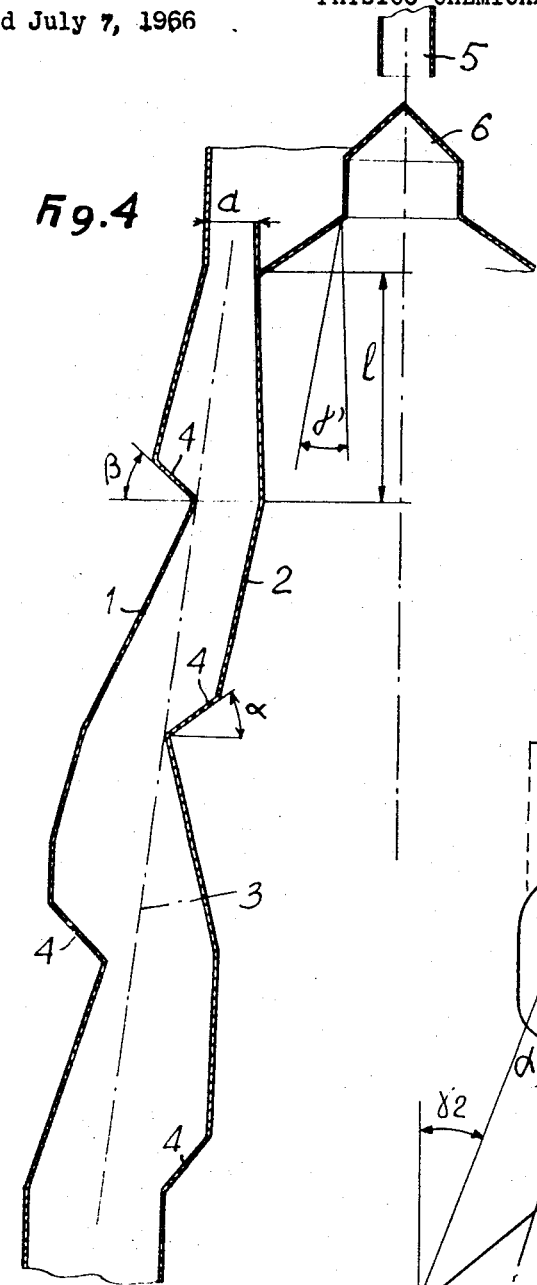
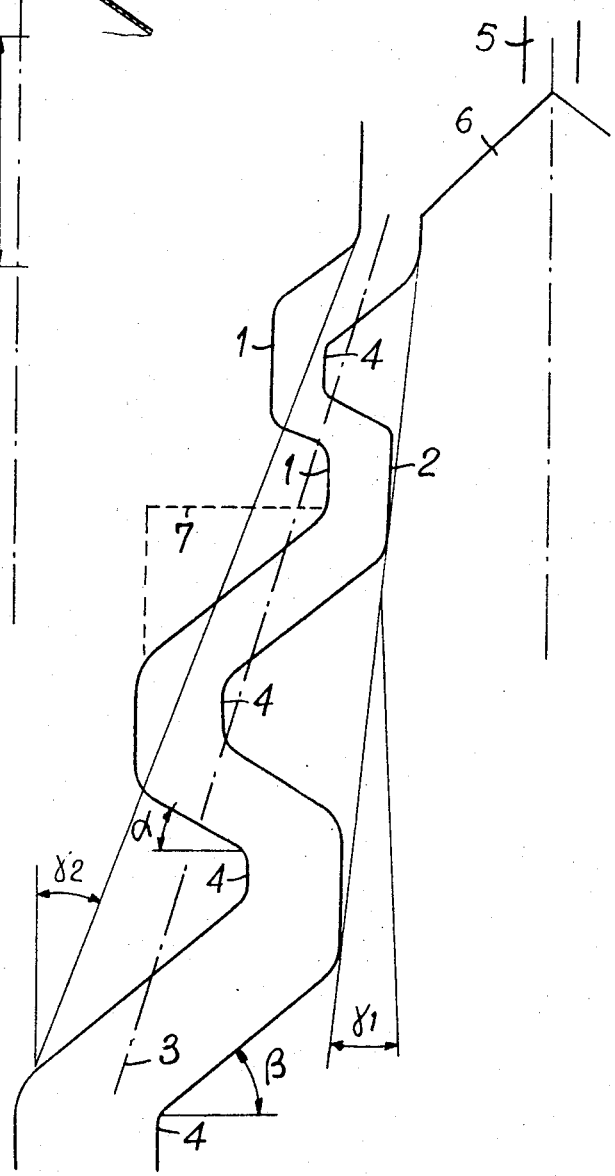
Fig.4
Fig.5

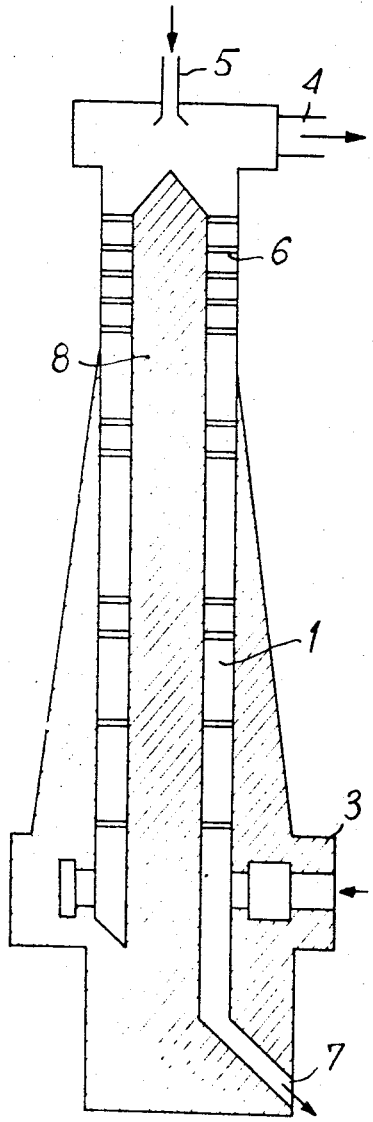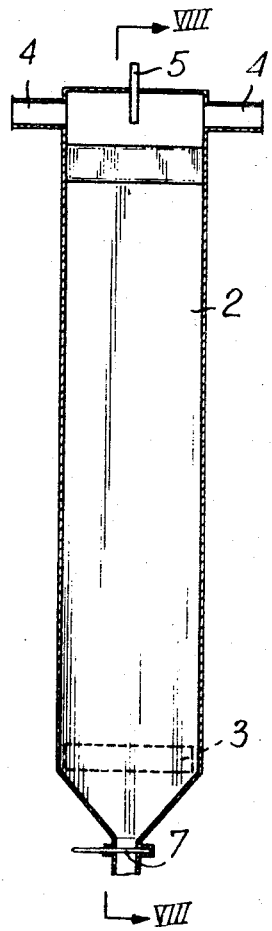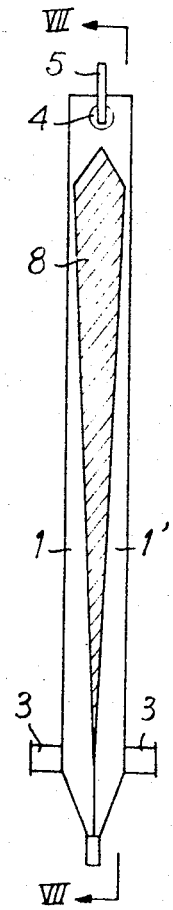

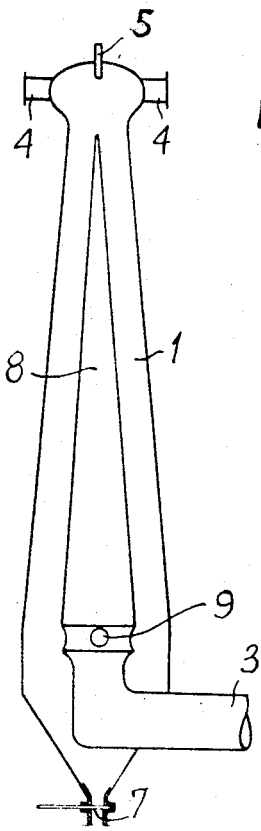
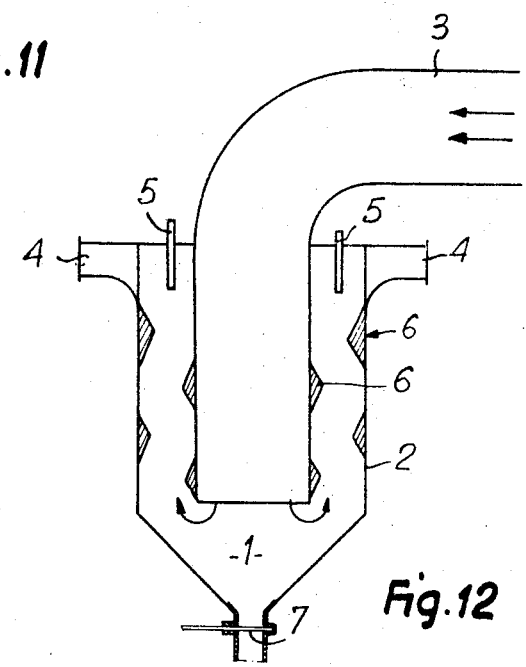
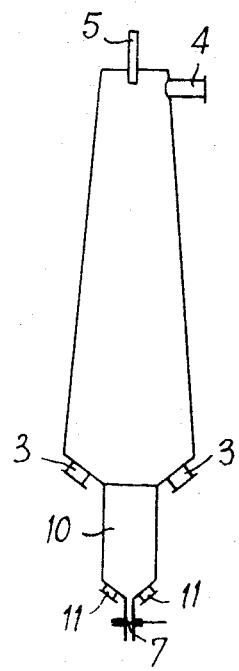
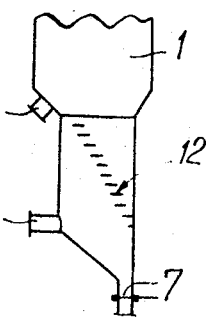

Dec. 22, 1970   Z. DE GALOCSY ET AL   3,549,295
MEANS FOR EXCHANGING HEAT BETWEEN GASEOUS AND/OR VAPOROUS
AND/OR LIQUID AND/OR SOLID MEDIA AND SMALL HEAT-CARRIER
PARTICLES AND THEIR APPLICATIONS FOR CARRYING OUT
PHYSICO-CHEMICAL PROCESSES
Filed July 7, 1966   11 Sheets-Sheet 9

Dec. 22, 1970     Z. DE GALOCSY ET AL     3,549,295
MEANS FOR EXCHANGING HEAT BETWEEN GASEOUS AND/OR VAPOROUS
AND/OR LIQUID AND/OR SOLID MEDIA AND SMALL HEAT-CARRIER
PARTICLES AND THEIR APPLICATIONS FOR CARRYING OUT
PHYSICO-CHEMICAL PROCESSES

Filed July 7, 1966     11 Sheets-Sheet 11

United States Patent Office 3,549,295
Patented Dec. 22, 1970

3,549,295
MEANS FOR EXCHANGING HEAT BETWEEN GASEOUS AND/OR VAPOROUS AND/OR LIQUID AND/OR SOLID MEDIA AND SMALL HEAT-CARRIER PARTICLES AND THEIR APPLICATIONS FOR CARRYING OUT PHYSICO-CHEMICAL PROCESSES
Zsigmond de Galocsy, Toulon, and Jean Prunet, Paris, France, assignors to Finacalor Aktiengesellschaft, Vaduz, Liechtenstein, a society of Liechtenstein
Filed July 7, 1966, Ser. No. 563,535
Claims priority, application Great Britain, July 9, 1965, 29,274/65
Int. Cl. B01j 1/14; F28d 21/00
U.S. Cl. 165—106                                    3 Claims

ABSTRACT OF THE DISCLOSURE

Apparatus for effecting heat heat exchange between a fluid and a heat exchange vehicle in the form of particulate material comprises a pair of heat exchangers arranged one above the other in interconnected relationship, the upper exchanger having a chamber within which a core is disposed to provide an annular space into which fluid can be introduced through an inlet and from which space it can be withdrawn to an outlet, the heat exchange vehicle being introduced into the annular space in contact with the fluid while obstacle means are provided in the annular space to cause local turbulence in the fluid. Lock means are provided for effecting transfer of the heat exchange vehicle from the upper exchanger to the lower exchanger while the two exchangers are operating at different pressures the lock means comprising a lock chamber containing a quantity of the heat exchange vehicle, a pair of sluices for opening the lock chamber and control valve means operable to admit the vehicle into the chamber.

---

Figure 2:
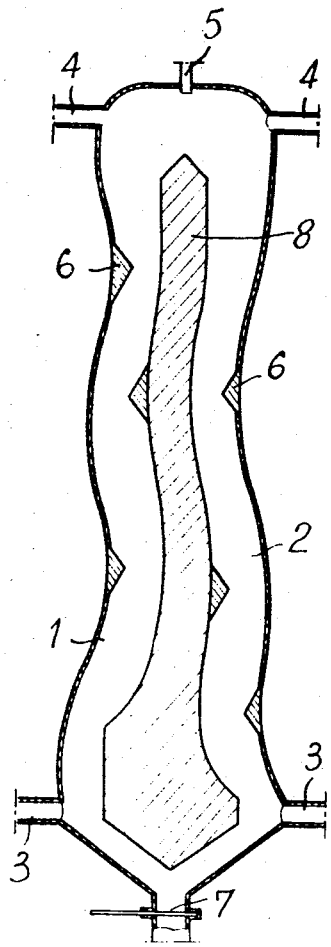

The object of the present invention is a method and means for exchanging heat between gaseous and/or vaporous and/or liquid and/or solid media and small heat-carrier particles, which are brought into contact in two series-connected heat-exchangers either unidirectionally or in counter-current and their application in carrying out physico-chemical processes.

It is already known to transmit, in a suitable chamber, the heat stored in hot gases to particulate heat carriers. The amount of heat thus stored in the small particles is then transmitted to materials to be heated in a second chamber. A further feature of this known method is that the heat carriers in the chambers are brought into contact with the rising gases in counter-current and preferably in a rain-like laminar current. To prevent the small particles from being carried out by the impact of the gases from the chambers, a definite velocity-limit has to be imposed upon the rising gases depending on the size and nature of the particles, and on the nature of the gases employed.

This entails several disadvantages. If a really good exchange of heat is to be obtained between the heat carriers and the gases, and vice versa, the chambers to be provided will come out rather high, since the relative rate of free-fall will become a rather high one in the rising gas-current. On the other hand, if the heat-carriers are selected from materials having a low rate of heat diffusivity, still higher chambers will be needed to enable the heat to penetrate as far as the centre of the heat-carriers. This requires the period of sojourn of the heat-carriers in the chambers to be increased considerably and this can only be achieved by a further increase of the height of the chambers.

More serious disadvantages can arise if the load of the heat exchanger decreases. The rate of fall of the heat-carrier particles is thus increased, the time of their sojourn reduced and the overall thermal efficiency is lowered.

Attempts have been made to increase the dwell time or sojourn of the particles in the chamber, and simultaneously to reduce its height by providing the chamber with sieves, screens or similar devices. The expedients hitherto proposed, however, bring about a considerable drop in gas pressure, i.e., a useless increase in entropy, such that the technical usefulness soon becomes impaired.

A further disadvantage of these known methods and means resides in that the rising gas column in the chamber, reaching its lowest temperature at the top, is unstable, which may lead to a non-uniform cooling of the gases or a non-uniform heating of the heat-carriers.

The present invention enables these disadvantages to be substantially avoided or minimised by providing a method for bringing about heat exchanges or physico-chemical reactions between the gas and/or vapours and/or liquids and/or solids on the one hand, and the heat-carrier vehicles constituted by solid particles or drops of liquid, the method being characterised by the fact that the solid particles or the drops of liquid are injected into the fluid whose flow is regulated in such a manner that it is located in a turbulent regime but in the immediate vicinity to the laminar regime.

The invention also consists in apparatus for carrying out this method, which apparatus is characterised by the fact that the heat exchanges are effected in a tower comprising a central core whose shape is adapted to that of the tower, the heat exchange being produced in the annular region between the walls of the tower and the walls of the central core.

Certain embodiments according to the invention are hereinafter described; a feature in all cases is that when the fluid flows in the heat-exchanger according to a turbulent regime close to the laminar regime, the time of sojourn of the solid particles or the drop of liquid in the exchanger is considerably increased without the pressure drop increasing in a considerable fashion.

Moreover, according to the present invention, the heat-carriers and the gaseous and/or vaporous media employed are chosen so, that the heat content or enthalpy-curve of the heat-carriers is higher than the heat content or enthalpy-curve of said media.

In putting the method according to the invention into practice, it is advantageous to employ heat-carriers made from ceramic materials, metals and cement combinations and metals or metallic oxides. The invention relates to heat-carriers in the form of balls, drops, cylinders and hollow cylinders. It is, moreover, advantageous that the heat vehicles utilised shall have diameters between 0.15 and 2.0 mm.

The method according to the invention may advantageously be applied in physico-chemical processes, such as gasification, reforming, cracking, hydrogen production, distillation of bitumen holding materials, calcination of mineral combinations containing water of crystallization or carbonates and the like. It has also been found that better technical and economical advantages may be attained in the heat content or enthalpy remaining in the smoke coming from such processes since it primarily serves to cover the heat need of the gasification of carbon, schlamm or liquid fuel with the aid of small hot particles of solid or liquid heat-carriers.

It is advantageous to provide the heat exchange chamber with a core portion equipped with guide and baffle means.

By such a core member—and depending on its shape—at least two separate portions will be formed in the chamber, each of which is provided with an inlet duct for the gaseous and/or vaporous media. The partition of the chamber into several parts has the advantage that if the load of the heat-exchanger is reduced, the different parts of the chamber may be closed one after the other, and in this way, even with very small loads, may attain a very good thermal yield without increasing the pressure drop. One should ensure at the same time that the heat vehicle grains are only introduced into that part of the cramber in use. The other advantage of the inner core is the increase in radiating surfaces, which leads to an appreciable increase in the coefficient of heat transmission in the high temperature region.

The core member of the heat exchanger is at least partly hollow and is provided with at least one aperture situated in the lower portion thereof, this aperture being connected to the supply source of the gaseous and/or vaporous media.

Underneath this lower portion of the heat exchanger chamber having inlet ducts for the gaseous and/or vaporous media a fluidized bed is provided, the cross-sectional area of which is a smaller one than that of the upper heat exchange chamber, while the bottom of the chamber containing the fluidized bed has at least one additional duct for the gaseous and/or vaporous media, as well as an exit device for the small heat-carrier grains. Besides, the chamber containing the fluidized bed is equipped with a step-grate or a trough grating.

The core portion of the heat-exchanger is equivalent to a second heat exchange chamber, which operates in series with a first one, while the top portion of this second chamber is provided with deflectors and with lateral apertures allowing communication between the two chambers.

It will be also of advantage to incline the axis and the walls of the heat exchange chamber which is fitted with guide and baffle means so that the angle of inclination of said means to the horizontal exceeds 35°.

This invention also relates to means for utilising heat-carrying liquids. It has been confirmed that the method described hereinabove, according to which the heat-carrying liquids the form of drops, may involve serious disadvantages. In principle, it is impossible to utilise liquid heat-carriers in the form of drops, if the charge decreases, since, in consequence of the rise in speed of fall of the drops, the latter reach at least in part, the base of the heat exchange chamber in the liquid state, which leads directly to an obstruction.

In accordance with this invention the transmission of heat from hot gases to heat vehicles may be considerably increased, if these hot gases, as a whole, are not introduced into the lower part of the first chamber, but into those sections situated higher up in the chamber. In this way, a reduced sojourn or dwell time for the heat-carrying vehicles can be tolerated. This thus brings about a reduction in the height of the chambers and the charge or pressure drops. The same effect is obtained in the second chamber, if the heat vehicles are introduced thereinto in slabs or slices.

In accordance with this invention new solutions for the evacuation of the heat-carriers are provided, such as those located between the two chambers the function of which is to transfer the heat vehicles in a sealed manner and without loss of pressure, and also for ensuring the evacuation out of the lower chamber. These are constructed as desired, as locks and/or by utilising the height of the column of grains. New solutions are also applied to the arrangements of the rotatable distributor, as much for the solid vehicles as the liquid ones.

It will be of further advantage if the inner walls of the heat-exchanger are distorted in spiral relative to the vertical axis of the heat-exchanger.

Figure 3:
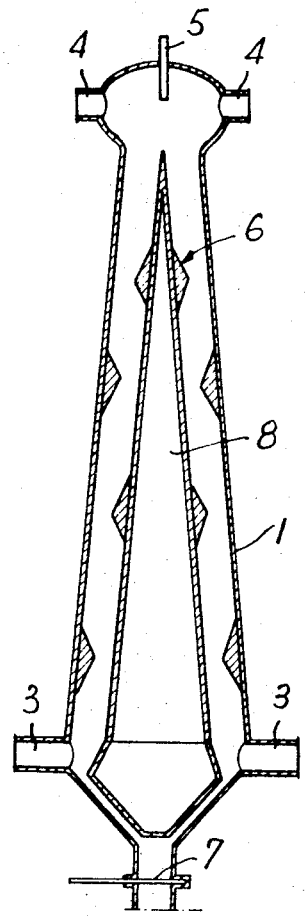
Figure 9:
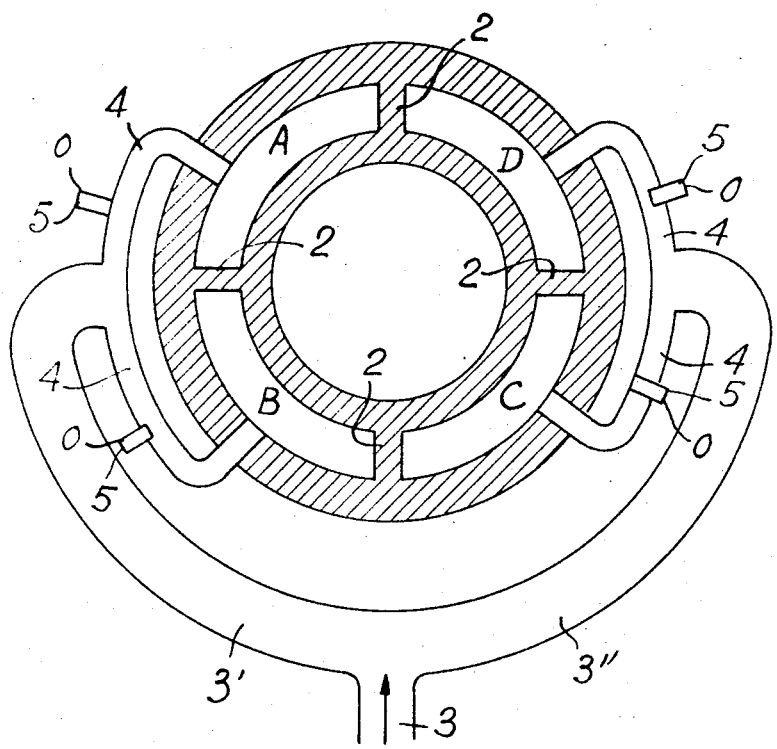
Figure 10:
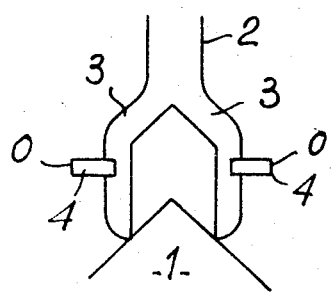
Figure 18:
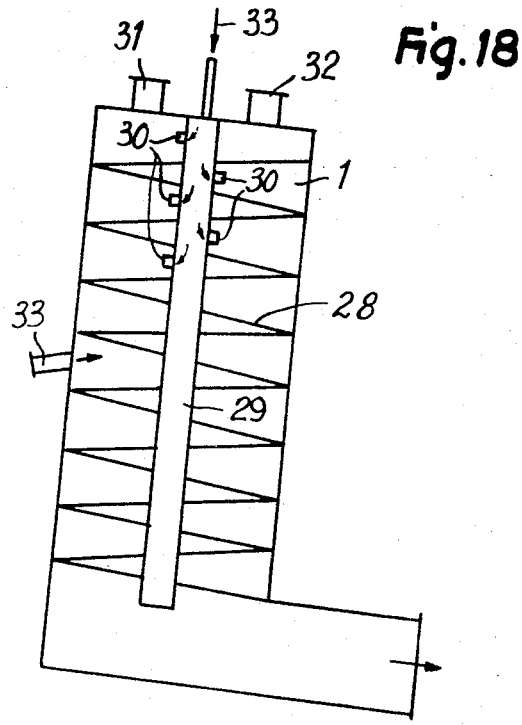
Figure 19:
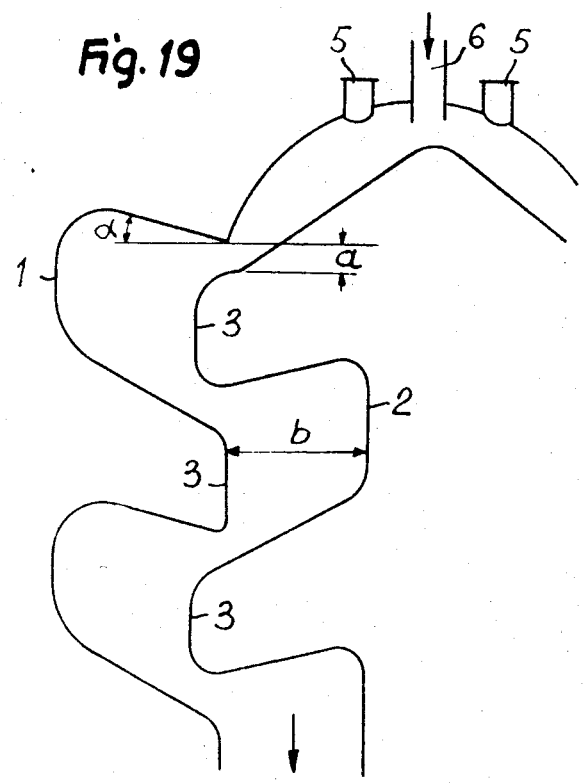
Figure 20:
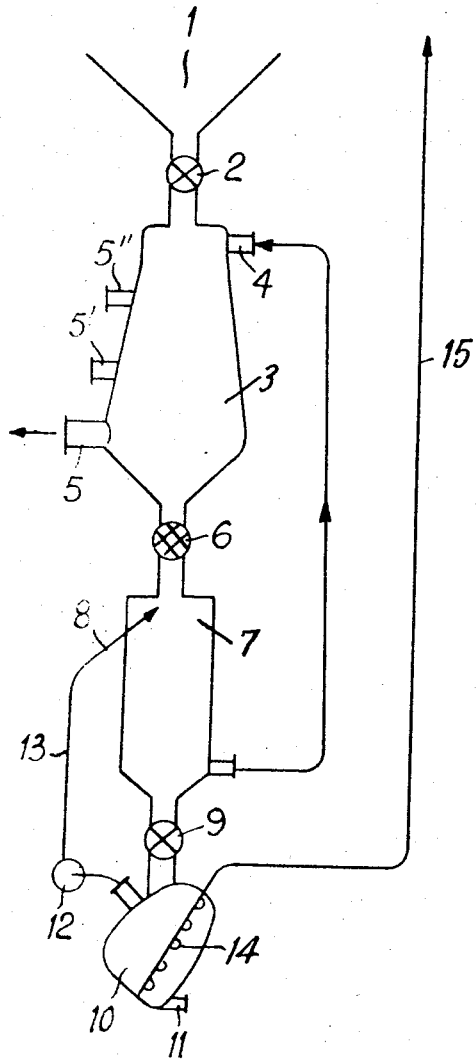
Figure 21:
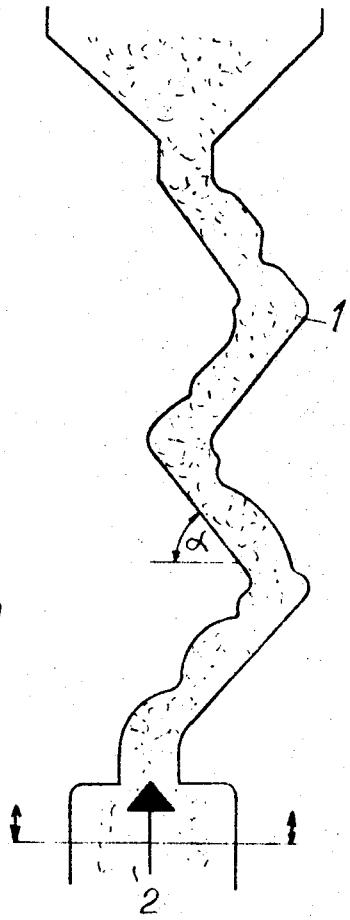
Figure 22:
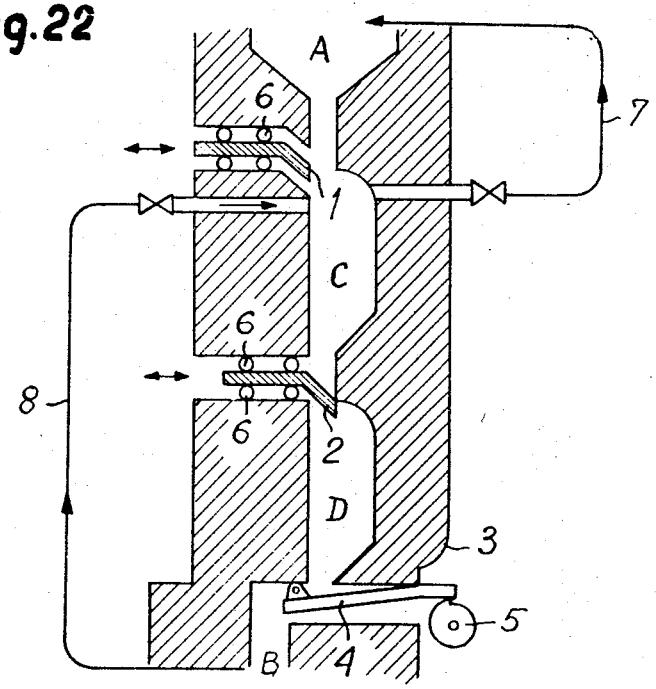
Figure 24:
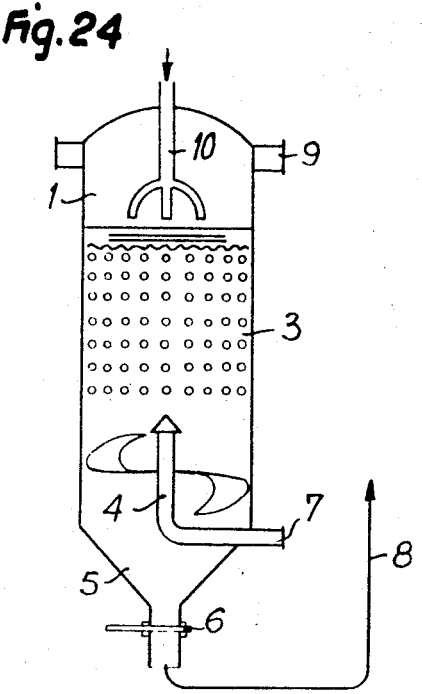
Figure 23:
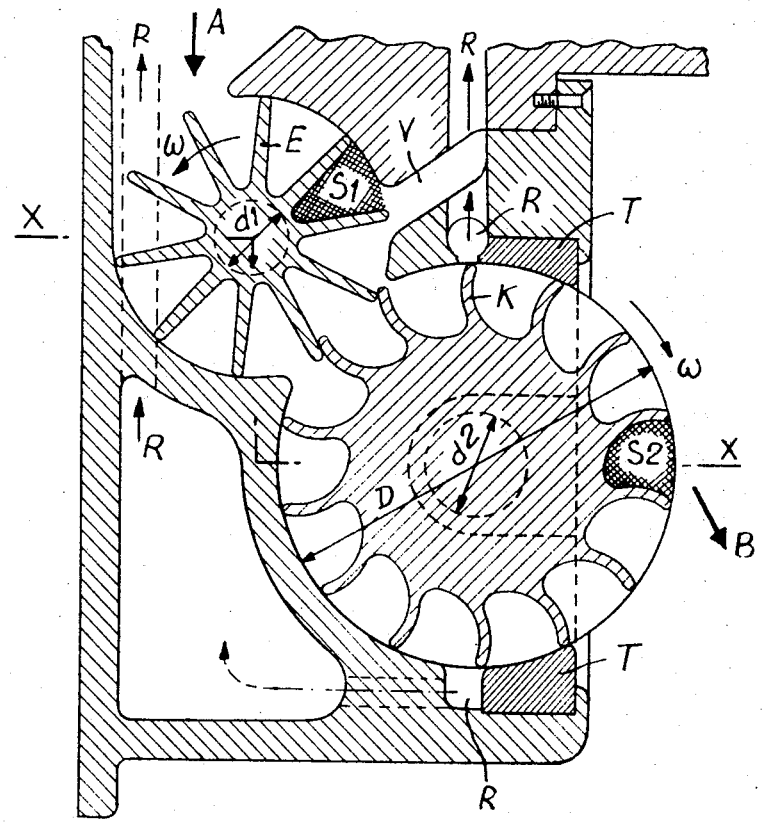
Figure 23A:
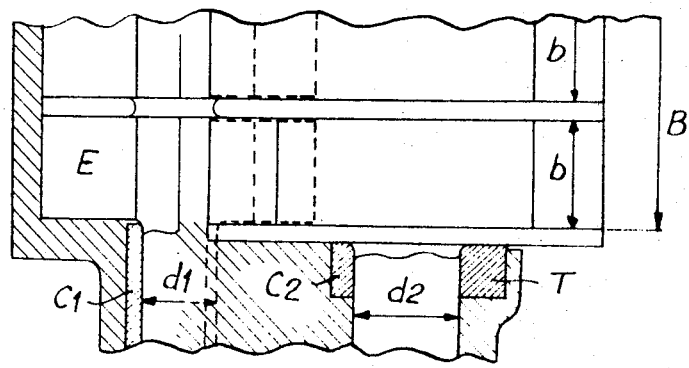

Further features of the present invention will be more easily understood from the following description of several possible embodiments with reference of the drawings attached, wherein:

FIGS. 1a and 1b represent a graph showing the relationship between the time of sojourn of the solid particles (ordinate) in a fluid in flow at a certain relative velocity, (abscissae), and a diagram showing the decrease in pressure of the fluid according to the velocity of the gas, FIG. 2 is a diagrammatic, longitudinal and sectional view taken along the axis of the upper chamber of an embodiment of a heat-exchanger according to the invention, FIG. 3 is a diagrammatic, longitudinal and sectional view of a second embodiment of a heat-exchanger, FIGS. 4 and 5 show some details of the walls of the heat-exchanger chambers, the general scheme of which is shown in FIG. 3, FIG. 6 is a longitudinal sectional view of a third embodiment, FIGS. 7 and 8 are longitudinal views of an other embodiments, FIG. 7 taken on line VII—VII of FIG. 8 and FIG. 8 on line VIII—VIII of FIG. 7, FIG. 9 shows a cross sectional plan view of an annular heat-exchanger chamber subdivided into four independant chambers, FIG. 10 shows diagrammatically the entry and distribution of the heat-carriers into the four chambers shown in FIG. 9, FIGS. 11 and 12 are longitudinal views of other embodiments, FIGS. 13 and 14 are longitudinal, sectional views of a heat-exchanger chamber provided with a lower portion containing a fluidized bed equipped with a step grate, FIGS. 15 and 16 are longitudinal views of a heat-exchanger having two concentric chambers, FIGS. 17, 18 and 19 are digrammatic, longitudinal and sectional views of a heat-changer adapted to physico-chemical processes, FIG. 20 shows diagrammatically an installation for vaporising and superheating the vapour of liquids, FIG. 21 shows a distributing device for the heat-carrying vehicles when small differences in pressure exist, FIG. 22 shows a lock device for admitting, transferring or elevating the heat-carriers, FIGS. 23 and 23a show another embodiment of the device for evacuating or transferring the heat-carriers, and FIG. 24 shows a device for the optimum utilisation of liquid heat-carriers.

Referring now to the drawings, FIG. 1 shows two diagrams upon which there are respectfully shown as a function of the flow speed of a gas the time of fall of the solid particles into the exchanger and the loss of charge or pressure submitted by the gas whilst passing through the exchanger.

Cold air is introduced into the base of a cylindrical pipe; at the top of this pipe there is installed a device which drops in a continuous fashion substantially spherical grains of corundum and having a diameter between 0.4 and 0.6 mm. Certain of these particles conveniently marked allow the mean falling time in the pipe to be measured.

It has been discovered that as the flow of air admitted into the pipe is increased the loss of measured charge between the base and the upper part of the pipe increases in a substantially continuous fashion. This is shown in FIG. 1b of the drawings in which the ordinates show the loss of charge in mm. of water and the abscisses of which show the mean speed of the air in metres/sec.

It has, moreover, been ascertained that the mean sojourn time of the particles in the pipe increases equally when the speed of circulation of the air increases; but at the moment of the passage of the air from laminar flow to turbulent flow there is produced a clear increase in the sojourn time, this increase finally bringing about unstable conditions in which the particles are taken along by the gaseous current. This is shown on FIG. 1a in which the ordinates show the mean sojourn time of the particles in seconds as a function of the mean speed of the air in m./sec. These drawings illustrate the invention very well since they show that for a fairly small supplementary loss of pressure (loss of pressure, for example, from 50 to 120 mm. of water) the sojourn time may be increased in a certain fashion (for example, from 7 to 20 seconds).

It has been verified by calculation that the fairly clear taking down of the curve which shows the variation of sojourn time of the particles as a function of the speed of the air, is produced in the vicinity of the limit speed separating a laminar gas condition from the turbulent condition. This has, moreover, been verified experimentally by observation of the gaseous currents in the interior of a similar tube (thus a transparent tube is utilised), in this same series of experiments it has been, moreover, possible to verify the birth of oscillatory or vibratory movements for the solid particles when the flow conditions of the air pass from the laminar to the turbulent; it is also by the same technique that it has been possible to distribute screens in the tube in order to induce secondary turbulences locally and more generally it has been possible to define the shape of the exchanger chambers which have been described above. Primarily, the different ideas for the construction of the chambers have been described for the case where the gas or the vapour are heated in the second chamber, thus constructions of chamber for heating solid or liquid materials, and finally novel devices such as devices for input and output.

In FIG. 2 wherein for clarity's sake only the upper chamber is shown—the lower chamber generally being symmetrical to the upper one especially if the latter is used for the heating of gases and/or vapours—are illustrated several essential means for the transformation of the laminar flow of the heat-carriers into a turbulent one, while ensuring that the pressure drop of the flowing gases is kept at a minimum.

According to the invention the side walls 2 of the heat-exchanger chamber 1, which in known heat-exchangers are vertical or slightly inclined ones, here show a wavy or meandering configuration, wherein a trough in the undulation of one wall corresponds to a ridge of the undulation in the opposite wall. It is advantageous for the inner walls of the heat-exchanger to be wound in spiral relative to the vertical axis of the heat-exchanger. To execute the form of the chambers in this way will be exceptionally advantageous, because in this case the speed of flow of the gases can be increased above the hovering speed of the heat-carriers without any danger of the grains being ejected from the chamber by the gasflow. It adapts the heat-exchanger to a wide range of changes occurring in the load, which is lacking in the exchangers known hitherto.

Hot gases are admitted to the bottom of chamber 1 through gas inlets 3, which gases when cooled emerge through outlet pipes 4 provided at the top of said chamber. Entry 5 mounted into the top of chamber 1 is used to supply small heat-carrier particles to the chamber, which will be distributed in uniform manner all over the cross-section of said chamber. The laminar fall of the particles is transformed into a rolling, bouncing, oscillating transverse motion when these particles hit the corrugated side walls 2 of the chamber. This not only helps to increase the transfer of heat, but also entails an essential lengthening of the time of sojourn of the heat carriers in the chamber. This will reduce the required height of the chamber, even if the throughput of the material to be treated is considerable. If the speed limit of the rising gas current, distributed uniformly over the cross-section of the chamber becomes excessive, an oscillating and whirling motion is imparted to the particles, prolonging thereby the length of their sojourn in the chamber and ensuring their closest contact with the gas molecules. The turbulence of the gas column and the whrling motion of the heat-carriers being thus increased does not lead, however, to an increase of the pressure drop if—as could be demonstrated by tests—guide and baffle means 6 are provided at suitable spots on the side walls 2. The heat-carriers will be pushed alternately from one wall of the heat-exchanger to the other. The hot gases should be admitted preferably tangentially into the chamber through the inlet openings 3. The bottom of chamber 1 is provided with an outlet 7 for the heat-carriers, through which the heated particles pass on to proceed into the second heat exchange chamber (not shown) into which are admitted the cold gases. As will be seen from FIG. 2, the cross-sectional area of chamber 1 is gradually reduced upwards and it is abruptly increased in the portion lying in front of the gas outlets 4. A substantially constant rate of flow of the rising gases, which contract because of their gradual cooling is thereby ensured. But the rate of flow of the rising gases is suddenly decreased, when these gases reach the considerably enlarged area opposite outlets 4, so that the heat-carrier particles are not carried away and out of the chamber by the gases. The guide or baffle means 6 are installed at those portions of the side walls which come closest to the chamber axis.

In many cases, it will be advantageous to provide chamber 1 with a core member 8 as schematically shown in FIG. 3. If very high temperatures in the order of 1700–1800° C. are to be attained within the chamber, said core member 8 may be cooled by means of an air current (not shown) so as to prevent a possible disintegration of the fire-proof bricks of the core. The period of sojourn of the heat-carriers in the chamber is again increased by deflectors and baffles 6. This embodiment will give the same advantageous results as the one shown in FIG. 2. Hot gases are admitted at the bottom of chamber 1 through inlets 3 and are discharged through outlets 4 at the top of the chamber 1. Normally the cross-sectional area of the chamber near the outlets 4 should be identical to the free cross-sectional area in the lower portion of said chamber, so that, owing to the sudden reduction in the velocity of these gases, the heat-carriers entering the top of the chamber through aperture 5 will be prevented from being carried out again with the gas flow through the outlets 4. The core portion may be conical as shown in the drawing or it might be in the shape of a vertical column or it may be provided wtih a corrugated surface. The shape of the bottom of said chamber, provided with outlet 7 for the particles, is otherwise adapted to the shape of the core portion.

There often exists the case where the pressure or charge in the heat-exchanger varies very little in example, for the final pressure re-heater of a blast furnace where, in general, the quantities of gas flowing from the heat-exchanger are reduced to about 20% of the maximum charge. On the other hand, there are other cases, in example, for an air re-heater or a gas re-heater situated behind a bit furnace where the quantity of gas flowing from the heat-exchanger in comparison with the maximum charge is only about 15 to 20% thereof. But, at the same time, the temperature of the smoke only varies to a very small extent. The heat-exchanger must thus be constructed in such a fashion that the gases to be re-heated in the second chamber may always be heated independently of the pressure at the same temperature. Attention must thus be paid to ensuring that the pressure loss shall be confined to tolerable values. The pressure loss itself depends on the following:

(1) the quantity of the heat-carriers located at any one time in the chamber;
(2) the friction of the gas; and
(3) the amount of desired turbulence.

Obtaining the desired temperature depends firstly on the time of sojourn of the grains in the heat-exchanger chambers. By the construction of particular profiles for the chambers, applicants have discovered adequate solutions for heat-exchangers whose variations in load are fairly small and for others attaining high values.

In FIG. 3, there are only shown the basic ideas for producing an internal core and the baffles; FIGS. 4 and 5 give particular details for such chamber profiles or shapes. Tests have shown that independently of the profile or shape of the chamber, a turbulent movement only appears at a certain speed. This turbulent movement of the gas involves the heat-carrying grains falling towards the base, the speed of fall of the grains depending not only on the simple impingement of the latter on the baffles but also on the size of the turbulence. This information forms the basis for the projects demonstrated in FIGS. 4 and 5 which are examples illustrating the principles of construction.

The profile or shape of the chamber in FIG. 4, where, for simplicity, it has only been shown that the upper chamber relates to the case where one must calculate with the minimum variations of charge. In principle, the profile of the chamber is formed in such a fashion that the turbulence only commences with a charge of about 80%. In this figure, the references are related as follows: 1 is the exterior wall, 2 is the wall of the internal core, 3 is the median line, 4 are the baffles, 6 is the point of distribution of the internal core, 5 is the supply tube for the heat-carriers, $a$ is the distance between the point of the baffle and the wall, $l$ is the distance separating the different baffle members; $\alpha$ and $\beta$ are the angle of the baffles to the horizontal and $\gamma$ is the angle of general inclination of the walls of the chambers to the vertical.

In order to maintain the turbulence in an adequate framework, the ratio $l/a$ must be about 3 to 4. It is thus of great advantage if the baffles penetrate only to about the median line. If these desiderata are respected, it will be found that even for a charge of 80% the sojourn time is attained and this lapse of time will increase more for a charge of 100% by reason of the increase in turbulence. In spite of everything, however, the fall of pressure even for a charge of 100% is only about 100 to 120 mm. C.E.

The diagrammatic FIG. 5 gives an example for the second case where the variation in charge is quite large. In order to obtain a sojourn time which is proficient, the shape of the chamber must be studied in such a fashion that the turbulence is produced, for example, with charge of 20%. Consequently, with a charge 100%, the turbulence considerably increases and the sojourn time of the grains increases 4 to 5 times the necessary lapse of time. The consequences of this stipulation are that for reduced charges as well as for high charges, the same heating temperatures may be attained secondly, the height of the chamber may be considerably reduced and, finally and thirdly, the loss of pressure considerably increases. In order to maintain this loss of pressure as low as possible, fairly long vertical channels have been provided in the circular space which permit lowering the turbulence produced by a baffle when it reaches the baffle member situated above it. For this figure the references and letters have the same meaning as for FIG. 4. The baffles penetrate deeper into the interior of the circular space and in such a fashion that the dimensions of the baffles at the base are greater than those of the baffles higher up. From this fact the general inclination to the vertical of the walls of the chambers are different one from the other and thus, for example, the wall of the chamber 1 has an angle of 5° but, on the other hand, the wall 2, for example, 15 to 20°. As tests have shown the drop in pressure in a chamber increases according to FIG. 5 and with a charge of 100% to only 200 to 250 mm. C.E., and naturally decreases to lower proportions when the charge is reduced. The vertical channels also have a further object. It has been demonstrated that H the shape of the chamber were made according to the shape shown in dashed lines, the fall in pressure would increase considerably. Due to these particular chamber shapes it thus possible to follow the actual variations of charge without having recourse to regulating means. $\alpha$ and $\beta$ depend on the slope of natural flow of the heat-carriers utilised. In general, that $\alpha$ must approximate the slope of natural collapse, but, $\beta$ must be above it.

In FIG. 6 there is shown one embodiment according to which the annular space between the core 8 and the walls of the chamber is provided with baffles 6 having the form of springs which are offset and disposed in superposed rows. According to statistical principles, the particles in their fall impinge several times against the baffles 6 in their trajectory, rebound vertically or transversely and thus, not only do they extend their sojourn time but they attain uniform distribution in the straight sections. It is advantageous that the baffles or deflectors 6 should have an aerodynamic cross-section in the direction of flow of the gaseous media. These deflectors 6 located on the walls of the heat-exchanger are advantageously inclined to the horizontal on their upper part.

According to the purpose, the yield, the size and the pressure conditions prevailing in the chamber, the cross-section of the chamber may be square, circular, semi-circular, elliptical or in the shape of a parallelogram. The shape of core 8 is always adapted to the chosen cross-section of the chamber. By way of non-limitative example there are shown in FIGS. 6, 7 and 8 some chambers having square or semi-circular cross-section respectively. The embodiment of the chamber as shown in FIGS. 7 and 8 has vertical side walls 2. Core 8 is tapered towards the bottom of the chamber and extends to outlet 7. In this way, two parallel chambers 1 and 1' are obtained, which may be charged differently. The chambers may obviously be provided with baffles or deflectors. Instead of chambers having cross-sectional areas, a heat-exchanger might be assembled of two or more chambers especially if higher pressures are to be applied.

FIGS. 9 and 10 show another form of construction of chamber for attaining uniform thermal yield when there is a variation in the charge. There can be seen in FIG. 9, which gives a plan view of the upper chamber, that this is subdivided into four chamber parts A, B, C and D. At a charge of 100% the four parts operate uniformly. But if the charge drops to 20%, for example, the gas is introduced into one chamber only.

The conduits B and C may be closed as desired or necessary by clasps in such a fashion that the gases are only introduced in the actual part of the chamber in use. This solution is above all valid when the heat-exchanger works at a maximum temperature of 1000° C. and in this case, only metallic walls are of any use. For upper temperatures, only ceramic materials are of use but tensions may appear in this ceramic material on a minimum charge and may lead, in certain cases, to the destruction of the walls.

FIG. 10 also shows in a diagrammatic fashion, the supply of the different chambers with grains and for this the same reference numerals are to be used.

When the separation walls 10 are taken so high that all the parts of the chamber are isolated one from the other and if each of them individually possesses outlet apertures the different gases may be simultaneously heated in the different parts of the lower chamber which is an exact counterpart of the upper chamber. For example, the combustion gas is heated in the chamber 1 and in the part of the chamber 2–3 and 4, the quantity of air necessary for the combustion of the gas. Such a stipulation possesses the advantage that, instead of having to have two heat-exchangers working independently one from the other, one heat-exchanger will be sufficient.

The core 8 can be used for the admission of hot gases to chamber 1 of which examples are shown in FIGS. 11 and 12. As can be seen in FIG. 11, hot gases are fed in at the bottom of core 8 through duct 3 which enter chamber 1 by way of an upwards inclined aperture 9 existing in core 8. If the high temperature zone in chamber 1 is to be enlarged, further outlets (not shown) can be installed above outlet 4.

The embodiment shown in FIG. 12 differs from the one to be explained in FIG. 11 in that the hot gases are supplied from above to enter the lower part of chamber 1, so that the total height of core 8 is exploited for the admission of the gases and in this way an optimally even manner of their distribution is ensured. As indicated by the arrows, the hot gas streams downward through the internally insulated core 8 into chamber 1. Core 8 is connected to gas inlet duct 3. Side walls 2 of the chamber may be vertical, for instance. Since the gas volume contracts towards the top of the chamber, the deflectors or baffles 6 are placed according to the required cross-section of the chamber, so that the upper baffles will project farther into the annular chamber 1 than the lower ones. The cooled gases leave through apertures 4 provided in the top portion of the chamber, while the heat-carriers are admitted through aperture 5 into the chamber. Moreover, the cross-sectional area of the chamber after above the highest deflector or baffle is suddenly increased relative to the other cross-sections, so that the exit velocity of the gases is reduced and the discharge of the particles is voided.

According to another embodiment of the heat-exchanger chamber which is not shown in the drawings, gases are introduced tangentially to the chamber at a speed which will force them against the chamber walls owing to centrifugal force. In such a case the heat-carriers will be admitted radially or axially so as to obtain a mainly transversal flow. In such circumstances the heat exchange chambers may be installed vertically or horizontally or even in an inclined position.

FIGS. 13 and 14 show two other embodiments of apparatus according to the invention. In these cases a free-fall chamber or any of the above described embodiments of chamber 1 are combined with a fluidized bed. The main stream of the gases enters through ducts 3 leading to main chamber 1 which, at its lower end communicates with a smaller chamber 10, the fluidized bed, wherein the particles that have fallen into it reach a turbulent fluidized condition by the motion of the gas conveyed through ducts 11.

The amount of gas supplied to the fluidized bed by way of ducts 11 is such, that a turbulent motion is imparted to the particles there present without these particles being forced back into the chamber 1. The cooled gases leave at the top of the chamber through an outlet 4 and the heat carriers having been introduced to the chamber 1 through the aperture 5 situated at the top of said chamber come out of the fluidized bed 10 by way of outlet 7 linked to a lower main chamber (not shown in the drawing).

In FIG. 14 is shown a single fluidized bed, provided with a step grate or trough grating 12.

As mentioned already, the heat exchanger essentially comprises two series- connected separated chambers of which in FIGS. 2–8 only the upper one is shown, however, in the drawings. According to other embodiments as shown in FIGS. 15 and 16, the core member provided and located in the upper chamber of the heat-exchanger as is shown in FIG. 3, forms the otherwise necessary second chamber and this arrangement obviously makes for a considerable reduction in the total height of the installation.

In FIGS. 15 and 16 the core member is located concentrically in the interior of heat-exchanger chamber 1 and plays the part of the second heat-exchanger chamber which in other embodiments will be found installed separately and underneath of chamber 1. In FIG. 15 a small quantity of heat-carriers is fed into the annular part (chamber 1) through inlet duct 5 and traverses this chamber in counter-current to the rising hot gases which enter said chamber at the bottom through duct 3. The cooled gases leave the annular chamber 1 through exit 4 at the top of the chamber and the heated particles are discharged by way of outlet 7 at the bottom of chamber 1. The media to be heated are admitted to the upper part of the inner chamber 13 through an inlet duct 14 and are discharged through an outlet 15 provided at the bottom of chamber 13. The heated particles leaving through outlet 7 are returned to inlet duct 16 provided at the bottom of chamber 13 and are there forced upwards mechanically or pneumatically so as to hit against a deflecting baffle 17 installed at the top of chamber 13 and when deflected, re-enter chamber 1 in cooled stated by the way of lateral apertures 18 provided between the wall of chamber 13 and baffle 17.

The forcing upwards of the hot heat-carriers can be dispensed with by applying the arrangement shown in the FIG. 16. Core member 8 forms an inner chamber 13. In both chambers 1 and 13 the gases stream upwards in counter-current to the falling heat-carrier particles. In chamber 1 the particles which have been introduced at the top of the chamber by duct 5 are heated by the rising hot gases entered at the base through duct 3. The hot particles discharged by outlet device 7 at the lowest end of the installation are fed pneumatically or mechanically into the upper portion of the inner chamber 13 (as indicated by a dashed line) where they transmit their stored heat to the media supplied to the lower end of chamber 13 through a duct 18, these thus heated media being discharged at the top of the chamber through exit 19. The cooled heat-carriers leave chamber 13 at the bottom by an outlet 20 and are re-admitted to chamber 1 again at inlet 5 as indicated by the full line. In general the pressure existing in the inner chamber 13 exceeds the one reigning in outer chamber 1 such as is the case in a heat-exchanger of a gas turbine and therefore the required dimensions of chamber 13 will be always smaller ones than those of chamber 1. Obviously the previously referred to means for lengthening the time of sojourn of the particles in the chambers are equally applicable in the embodiments shown in FIGS. 15 and 16. Owing to the concentric arrangement of chambers 1 and 13, the total height of the heat-exchanger is now reduced to some 4–5 meters taking up much less place space in this manner. In the embodiments as described above, the exchange of heat may be further improved by injecting the gases in a pulsating current and adapting the frequency and amplitude of one pulsation as well as the duration of one pulsation to the prevailing load. It should be noted also that the diminutions of the cross-sectional area of the chambers towards the bottom or the top should be effected according to the hotter or colder state of the gases passing through the different cross-sections, because, obviously these areas will decrease parallel to the temperature and hence to the volume of the gases in question.

As far as measures against a possible discharge of the heat-carrier particles by the gases, it has been mentioned already in the descriptions of some embodiments, that the cross-sectional areas of the upper portions of the chambers are abruptly and considerably increased, so that the velocity of the gas flow will drop suddenly in the zone concerned.

The angle of this cross-sectional increase should preferably not exceed 7°.

Attention has often been drawn to the fact that when it is a question of heating gases or vapors in the second chamber the shape thereof should be as similar as possible to the first chamber. Physical processes, which are the most simple are as follows: humid media, vaporisation of liquids, etc. that is to say, changes in state. Examples of homogeneous reactions between gases are represented by the following equations:

$$CH_4 + CO_2 \rightarrow 2C + 2H_2O$$
$$CH_4 + 2H_2O \rightarrow CO + 3H_2$$

In this category, there also equally belong the reactions between liquid materials, where under the action of heat, chemical transformations are produced. Amongst heterogeneous reactions there should be mentioned interalia the distillation of solid or liquid materials, cracking, calcination, gasification and the like. The quantity of heat necessary for carrying-out all these processes must always be largely furnished by the heated heat-carriers in the first chamber. It is thus clear that the second chamber must be constructed differently for particular processes. Certain processes, independently of the fact that it is a question of simple changes of phase or of homogeneous or heterogeneous reactions, may be carried out in counterflow, or others with currents in the same direction.

In the second chamber there is a counterflow if the shape of the chambers shown in FIGS. 13 and 14 are chosen or where the free fall of the heat-carriers is combined with the fluidized bed. Similarly, there will be a counterflow in the chamber, according to the diagrammatic FIG. 17. An installation such as described in FIG. 17 may be used for the gasification of oils or the re-forming or for carrying-out sublimation processes. Its method of operation for reforming of hydrocarbons is that which will be described below:

Cold or preferably preheated natural gas is fed from above into a heart-shaped chamber 1 coming from a duct 22. The reaction steam and/or $CO_2$ which equally serve as a carrier for particles heated to a temperature of 1500–1700° are injected into the lower portion of the chamber through a duct 23 at such a rate, that the heat carriers are forced upward to the area when the reactions between the natural gas and steam or $CO_2$ will occur. The reformed gas leaves chamber 1 through a lateral exit 4 situated at the top of the chamber and which is connected to separator 24. In this separator eventually particles carried out and soot which might have been formed are severed from the gas and are returned to inlet 23 through a pipe 25 provided with a stop valve 26. The thus recirculated soot can be gasified in chamber 1. The enthalpy (heat content) of the reformed gas is used for preheating the natural gas and the steam. The heat-carriers are heated in some heat-exchanger (not shown) of one of the above discussed types. Furthermore, a lateral aperture 27 is provided at the bottom of chamber 1 serving for the emptying of the chamber. This arrangement will allow the carrying-out of the processes under increased pressure.

Special measures are to be taken if the operation is to be carried out in unidirectional current. This will be the case when solid and gaseous or vaporous materials are to be treated. Supposing the unidirectional current is directed downward, it will become necessary to slow down the free fall of the heat-carriers as well as that of solid material if such is treated. A simple solution is shown at FIG. 18. The heat-carriers are heated in a chamber (not shown) of any desired construction from which the particles heated to the required temperature are introduced to the heat-exchanger illustrated in FIG. 18. It consists of an inclined chamber 1 containing a core member in the form of a central tube 29 applied to which are helical fins 28. The central tube 29, which has several outlet apertures 30 serves, for instance in the case of coal dust gasification, for the supply of highly heated steam, brought to the required high temperature by means of a partial current of very hot heat-carriers. These heat-carriers are conveyed to the heat-exchanger, which at the same time serves as a reactor, through a duct 31, applied laterally at the top of the heat-exchanger. The preferably highly preheated coal dust is passed into the chamber through another inlet 32 also laterally joined at the top of the heat-exchanger and steam enters through a duct 33 connected to the upper portion of the central tube 29. By means of the steam or the gases produced by gasification, a rolling motion is imparted to the heat-carriers on the helical fins, which motion will be naturally slower on the horizontal or nearly horizontal surfaces of the helix than it will on the more slanting faces. Heat-carriers, coal ash, the gases generated and any excess steam, leave the reactor together at its base and they may be separated by known methods. The enthalpy (heat content) of all these materials is used for preheating coal dust, oil, etc. as well as for the production of the steam needed for the purposes of the gasification. If required, a fresh partial current of hot heat-carriers can be fed into the reactor additionally by way of aperture 33. It is preferable to have the heat-carriers at the top as well as laterally by means of a partial steam current.

It will be apparent that a reactor or heat-exchanger of this type can equally well be used for the gasification of oil or for the re-forming of gaseous hydrocarbons. If synthetic gas (such as ammonia, methanol, etc.) or pure (from a gas engineering point of view) hydrogen is to be produced, the amount of excess steam to be supplied to the reactor is important, so that the CO— content of the gases can be oxidized to $CO_2+H_2$ in some connected container at optimum temperature.

FIG. 19 shows another form of chamber for application to physical and physico-chemical processes and in which the time of sojourn necessary is ensured by means of baffles. In FIGS. 1, 2, 3 and 4 described above, the baffles serve as surfaces for rebound and counterflow. In contradistinction in FIG. 19 it is a question of a unidirectional current or flow and for this reason the baffles only serve here as rebounding surfaces. The guarantee of the sojourn time necessary for a good exchange of heat is attained here by a heavy increase in the volume of carrying gases or reaction gases. The increase in the volume naturally leads to a reduction of the speed of the gas and the changes of speed of the heat-carriers are followed only by a certain recession of the phases. In FIG. 19, the references 1 and 2 designate the limiting walls of a chamber. The supply pipes for gas or vapour or steam 5 and the pipes 6 serve for feeding in the hot heat-carriers coming from a first chamber which is not illustrated. Reference $a$ designates the smaller section and $b$ the larger section: $b$ must be at least four times as big as $a$. The angle $\alpha$ must not exceed in general 7°.

It has already been proposed to vaporise liquids in contercurrent in which heat-carriers (solids or pastes) are introduced from above the vaporisation space. The liquid to be vaporized is introduced from the base. The vapor or steam was, at the same time, superheated in the same space. Similarly, the preheating of the liquid was effected in the same space in the lower part of the installation space. But it is often preferable to separate the preheating vaporisation and superheating and, in this case, it is necessary to choose continuous currents.

FIG. 20 gives explanations concerning such an installation. The heated heat-carriers in the upper chamber 1, of which alone the lower part only is illustrated, are brought in through the exit means 2 into the superheater 3. In this case, vapor or steam produced in counter current in the base is introduced through conduit 4. In order to decrease the speed of the fall of the heat-carriers, which will be very great in a continuous unicurrent, the superheater must be constructed in such a fashion that the devices for reducing the speed of fall (baffles) (not shown) are provided therein. The superheater vapor or steam leaves by pipe 5. The temperature of superheating must be regulated partly by the quantity of heat-carriers introduced and partly by its initial temperature. Other means for control exist when the vapour or steam is collected by the lower part 5′ or 5″. The heat-carriers become cooled in the mean time, practically to the same temperature as the super-heated steam and are then led from the space 3 by virtue of the exit installation 6 into the steam producer 7. At the same time, through the pipe 8, liquid atomized into fine drops is projected on the heat-carriers and instantaneous vaporization is produced. According to the balance of the heat content of the heat-carriers and the amount of liquid drawn in, the process may be conducted so that the quantity of liquid is entirely vaporized and the vapor thus produced superheated to a small extent. The dry vapor thus produced then goes via the conduit 4 into the superheater. The heat-carriers which are also dry are led by the exit device 9 into the preheater 10, in which circulation by counterflow is predominant. Devices for decreasing the speed of fall are also provided in the vaporizer 7. The heat-carriers which are cooled leave the space 10 by the exit device 14 and are then led by the line 15 into the first chamber. The cold liquid enters into the preheater 10, introduced by the pipe 11 and is led to the preheated state due to the pump 12 and by the conduit 13 to the pipes 8. Only the exit devices 2 and 9 must be constructed for a sealed pressure.

The vaporizer and the superheater operate at a certain chosen pressure. On the other hand, the preheater 10 has only to be placed under pressure. The heat-carrying grains may be removed and re-cycled out of the preheater 10 by simple means, such, for example, as a transporting gear 14.

Concerning the shapes of chamber which are most appropriate, this depends equally on the use of such means which have for an object, transferring the heat-carriers from one chamber into another. Hereinafter the applicants propose new solutions for this problem.

It often happens that small differences in pressure are prevalent between the two chambers but it is, nevertheless, that the gas or vapors do not leave the first chamber for the second and that they do not flow from the second chamber into the first and it is, above all, necessary to ensure that this loss of gas shall be minimal.

FIG. 21 shows the most simple solution in the form of a labyrinth. In the upper chamber, the labyrinth pipe 1 is filled with heat-carriers which are in themselves an obstacle against the very high pressure prevailing in the lower chamber. This is also reinforced by a zig-zag shaping of the pipe 1. The amount of heat-carriers is controlled by the ascending and descending movement of the cone 2. The angle $\alpha$ must be more than the natural angle of collapse of the heat-carrier. In the case of molten heat-carriers an angle of 3 to 5° is sufficient.

If the difference in pressure were greater, for example 5 to 6 atmospheres, the schematic FIG. 22 gives details of a lock which has for its function to transfer the heat vehicles even when there are large differences in pressure and with very small losses of gas from the upper chamber A into the lower chamber B or also to evacuate the lower chamber. In the position illustrated closing member 1, is withdrawn and therefore the space C will be charged. Before opening the closing member 2, the closing member 1 will be closed. After opening the closing member 2 the heat vehicles congregated in the space C flow through the dosing device 3. This latter consists, for example, of a plate 4 which is maintained in rhythmical movement by a cam 5. The angle is chosen in such a fashion that at the time of highest position of the plate 4 the angle shall be smaller than the natural slope of the heat vehicles. In this position the grains cannot fall towards the base. The object of such a device is to conduct the heat vehicles into a continuous current in the lower chamber when the spaces C and D are periodically filled. Instead of the device illustrated, the same object can be obtained, for example, with a cell wheel or the like. In order not to overload the space C, it is preferable to provide for the latter a dosing device also. The closing members 1 and 2 are conducted between the rollers 6, particularly on strong pressure relationship. In order to be able to re-fill the space C and after closure of the plate 2 the gas will be in the space under heavy pressure and evacuated by opening the conduit 7 and conducted into the upper chamber. The plate 1 is only re-closed after the pressure has gone down. On the other hand, the space C must be under pressure by the conduit 8 and before the opening of the plate 2 in order to prevent the heat vehicles in the space C from becoming projected towards the upper part upon opening of the plate 2 and which will be consequently reduced into dust. If a lock is chosen for evacuating the heat vehicles out of the upper chamber, there will be produced a decrease in pressure or later the pressure will form in the opposed direction.

The exit device, according to FIGS. 23 and 23a may be used when there are large pressure differences. In this drawing the following reference numerals are used:

A: is the entry for the heat-carriers from the upper chamber

B: is the exit for the heat-carriers into the lower chamber

E: is the cell wheel serving as a dosing device

K: is a drum serving for evacuation of the heat-carriers

C' and C": are sealing members

T: are other sealing members $d'$ and $d''$: are diameters of the shafts

R: represents channels for equalising the pressure

S': is the volume of a cell of the gear wheel E

S": is the volume of a cell of the gear wheel K $\omega$: represents the angular speed pertaining thereto.

During the construction, it must be ascertained that S" be gerater than S', and, moreover, $\omega'$ and $\omega''$ must be chosen in such a fashion that the centrifugal force cannot eject the grains out of the cells when there is a charge of 100%.

So far as FIG. 24 is concerned the applicants have recognised the disadvantages of such a process where the molten heat-carriers are decomposed into little drops. This is actually possible that, at the time of a big reduction in charge and due to an increase in the speed of fall, the drops will only solidify partly into solid grains and, consequently, form contaminants on the wall and occlude the base. The existing advantage demonstrate without possible hesitation the utilisation of liquid heat-carriers since, these latter are entirely destroyed by this appearance. One of these advantages is that temperature of the heat-carriers remains constant up to the moment of their solidification. This leads to an appreciable increase in the heat exchange. The second advantage consists in the fact that two large exigencies for the solid heat-carriers, such as large resistance to thermal shock, durability, resistance to abrasion, etc., here are of little importance. Finally, liquid heat-carriers may be utilised to obtain high temperatures which are impossible to attain with solid heat-carriers. On large differences in pressure, add to this fact that the tension of the vapour will decrease on an increase in the pressure and, thus it can be avoided that the heated gases bring with them heat-carrying vapours.

The novel and surprising idea of placing a liquid layer above the heat-carriers already solidified, as has been demonstrated in FIG. 24, causes the disadvantage of the method proposed up to now to disappear, of introducing liquid heat-carriers in the form of drops. Similarly, it is no longer necessary, at present, to utilise chambers which are made conically or with baffles, etc. The gas flow, well-partitioned at the base, guards the heat-carriers already solidified, into large and small grains, in a sort of turbulent movement. The bubbles of gas escaping guard this layer by bubbling and, at the same time, prevent the liquid layer from solidifying entirely; on the other hand, this layer solidifies in grains as they fall towards the base.

FIG. 24 shows the lower chamber for re-heating the gas. 1 represents the free space of the gas situated above the liquid layer. Therebelow, there will be found the layer 3 formed of solidified grains which are evacuated from the chamber 1 due, for example, to the device 4 which is already well known in the technique of gases. They are thus collected in the cone 5 and removed by the conduit 6 as well as re-circulated by the conduit 8 into the first chamber (not shown). The cold gases to be heated are introduced into the chamber 1 through the conduit 7 and due to the conduit 9 they arrive in the utilization space. The liquid heat-carriers flow through the pipe 10 into the chamber and are subdivided on the upper total surface in different flows.

We claim:

1. Apparatus for effecting heat exchange between a fluid and a heat-exchange vehicle in the form of particulate material, comprising a pair of heat exchangers arranged one before the other, means connecting said heat exchangers, the upper heat exchanger having a heat exchange chamber, a core within said chamber disposed to provide an annular space between the inner walls of the chamber and the outer surface of said core, inlet means for introducing said fluid into said annular space and outlet means for withdrawing said fluid therefrom, means for introducing said heat exchange vehicle into said annular space in contact with said fluid, obstacle means within said annular space arranged to cause local turbulence in said fluid, and lock means for effecting transfer of said heat exchange vehicle from said upper heat exchanger to said lower heat exchanger while said upper and lower heat exchangers are operating at different pressures, said lock means comprising a lock chamber for containing a quantity of said heat-exchange vehicle, a pair of sluices for opening said lock chamber and controlled valve means operable to admit said vehicle into said chamber.

2. Apparatus according to claim 1 wherein said sluices have one end inclined to facilitate the flow of said vehicle and wherein the pressure between the lock chamber and the heat exchange chamber can be equalized by said sluices in synchronism with said valve means for opening and closing said lock chamber.

3. Apparatus according to claim 1 in which the obstacle means cause local variations in the velocities of the vehicles and of the fluid are formed as a profile of the inner walls of the chamber and of the outer surface of the core.

References Cited

UNITED STATES PATENTS

| 2,534,752 | 12/1950 | Beckberger | 23—288X |
| 2,576,058 | 11/1951 | Weber | 23—288X |
| 2,635,864 | 4/1953 | Goins. | |
| 3,150,063 | 9/1964 | Comte | 23—284X |
| 3,409,408 | 11/1968 | Ballestra | 23—284X |
| 2,967,693 | 1/1961 | Cunningham et al. | 23—288.3GX |
| 3,010,806 | 11/1961 | Bevy | 23—288.3G |
| 3,136,536 | 6/1964 | Heinemann | 34—57X |
| 3,185,457 | 5/1965 | Boll et al. | 263—19B |
| 3,192,018 | 6/1965 | Minami | 23—262 |
| 3,215,505 | 11/1965 | Schmalfeld et al. | 23—284 |
| 3,219,420 | 11/1965 | Dielenberg | 23—284 |

JOSEPH SCOVRONEK, Primary Examiner

U.S. Cl. X.R.

23—284; 48—196; 263—19; 302—49, 55